United States Patent
Chandezon et al.

(10) Patent No.: US 6,571,846 B2
(45) Date of Patent: Jun. 3, 2003

(54) TIRE HAVING BEADS OF IMPROVED STRUCTURE

(75) Inventors: Pierre Chandezon, Clermont-Ferrand (FR); Claude Eynard, Chanat la Mouteyre (FR); Olivier Muhlhoff, Clermont-Ferrand (FR); Jean-Jacques Drieux, Volvic (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 13 days.

(21) Appl. No.: 09/904,935

(22) Filed: Jul. 13, 2001

(65) Prior Publication Data

US 2002/0020480 A1 Feb. 21, 2002

Related U.S. Application Data

(63) Continuation of application No. PCT/EP99/10472, filed on Dec. 30, 1999.

(30) Foreign Application Priority Data

Jan. 13, 1999 (FR) .............................. 99 00307

(51) Int. Cl.$^7$ ........................ B60C 15/00; B60C 15/06
(52) U.S. Cl. .................... 152/454; 152/379.5; 152/456; 152/539; 152/541; 152/544; 152/547; 152/548; 152/552
(58) Field of Search ................................ 152/539, 541, 152/544, 454, DIG. 6, 456, 548, 545, 547, 552, 379.5

(56) References Cited

U.S. PATENT DOCUMENTS

| 5,634,993 A | 6/1997 | Drieux et al. |
| 5,785,781 A | 7/1998 | Drieux et al. |
| 5,971,047 A | 10/1999 | Drieux et al. |

*Primary Examiner*—Adrienne C. Johnstone
(74) *Attorney, Agent, or Firm*—Baker Botts L.L.P.

(57) ABSTRACT

A tire has a radial carcass reinforcement having a bead, the seat of which is inclined towards the outside, the bead heel axially to the inside and reinforced by at least one reinforcement element, the bead toe axially to the outside and having a profiled element of rubber mix in the form of a wedge defined by two sides, the mix having a Shore A hardness greater than the Shore A hardness of the rubber mixes radially above, wherein the reinforcement winds around the annular element to form an upturn, the end of which is located axially to the outside of a straight line $P_2$ perpendicular to the axis of rotation and passing through the center of gravity of the meridian section of the element, and axially to the inside and radially to the outside of the straight line $P_1$ supporting the radially outer side of the profiled element.

7 Claims, 1 Drawing Sheet

TIRE HAVING BEADS OF IMPROVED STRUCTURE

This is a continuation of pending PCT/EP99/10472, filed Dec. 30, 1999.

BACKGROUND OF THE INVENTION

The present invention relates to a tire intended to be mounted on a rim having at least one first frustoconical seat, the generatrix of which has an axially outer end which is closer to the axis of rotation than the axially inner end.

Such a tire is described in U.S. Pat. No. 5,785,781. It comprises at least one first bead, which is intended to be mounted on said first rim seat which is inclined towards the outside, said first bead, of conventional axial width, which ends axially to the outside in a bead toe, having a bead seat, the generatrix of which has its axially outer end closer to the axis of rotation than its axially inner end, said generatrix being extended axially to the outside by an outer face defining the bead toe, said face forming with the axis of rotation an angle γ, which is open radially and axially towards the outside, of less than 90°. The radial carcass reinforcement of said tire, which is anchored within each bead to at least one inextensible annular reinforcement element, has a meridian profile, when the tire is mounted on its operating rim and inflated to its operating pressure, with a direction of curvature which is constant in the sidewalls and bead which ends in the toe and which is such that, in said bead, the tangent to the point of tangency of said profile with the inextensible annular element of said bead forms with the axis of rotation an angle ø of at least 70° which is open towards the outside.

The bead of such a tire, and more particularly the structure of the hooking of the carcass reinforcement, may be variable. In U.S. Pat. No. 5,971,047, the radial carcass reinforcement is anchored to the inextensible element by winding around said element from the heel to the toe of the bead to form an upturn extending into a profiled element of rubber mix in the form of a wedge defined by two sides starting from an apex A located beneath the section of the coated bead wire, the radially outer side forming, with a straight line parallel to the axis of rotation passing through said apex A, an acute angle $ø_1$ of between 20° and 70°, which is open radially and axially towards the outside, and the radially inner side forming with said parallel line an acute angle $ø_2$ of between 0° and 30°, which is open radially towards the inside, and the rubber mix forming the profiled element, axially adjacent the bead wire, having a Shore A hardness equal to at least 65 and greater than the Shore A hardness(es) of the rubber mixes axially and radially above the bead wire and the profiled element.

The combination of the meridian profile of the carcass reinforcement as described in the first above-identified patent with a hooking structure as described in the second above-identified patent makes it possible to obtain a very good compromise, firstly between the properties of on-road behavior of the tire inflated to its recommended pressure, and secondly between said properties when it is inflated at reduced or even zero pressure, the beads of said tire remaining perfectly in place when travelling in degraded mode owing to their above-described structure, which structure permits modification (increase) of the clamping of the bead toe on the mounting rim as a function of the tension of the carcass reinforcement, which makes it possible to have initial clamping on rim of low value, given that said clamping will increase when the tire is inflated to its recommended pressure.

The preferred solution described in U.S. Pat. No. 5,971,047 is such that the carcass reinforcement upturn has a length such that it is in contact with the total perimeter of the profiled element or wedge; it thus forms the two, radially outer and inner, sides of the rubber profiled element and the side opposite the apex or center of said profiled element, and the end thereof is located axially beyond the point of intersection of the two, outer and inner, sides. The part of the upturn immediately adjacent the part which is wound about the bead wire can form firstly the radially outer side of the profiled element or wedge and then the side opposite the apex of said profiled element, then finally the radially inner side of said profiled element, ending beyond the junction point of the two, outer and inner, sides. It may also first form the radially inner side of the profiled element or wedge, then the side opposite the apex of said profiled element, then finally the radially outer side of said profiled element, ending in the same manner as previously.

The above two structures are complicated and difficult to implement industrially, and are therefore expensive. Furthermore, under extremely severe loading conditions, the pressure exerted by the toe of the bead on the axially outer protrusion of the rim and the high temperature which said bead may reach are such that there may occur, at the end of its life, cracking in the rubber of the protective outer layer of the bead, which cracking is propagated along the upturn, reaching the radially inner face of the anchoring bead wire with destruction of said bead.

SUMMARY OF THE INVENTION

The object of the invention is to overcome the disadvantages above while retaining the excellent anti-unwedging or anti-unseating properties of the tire in question.

The tire having a radial carcass reinforcement, in accordance with the invention, comprises, viewed in meridian section, at least one first bead, the seat of which has a generatrix, the axially inner end of which lies on a circle of diameter greater than the diameter of the circle on which the axially outer end is located, the bead heel being axially to the inside and being reinforced by at least one inextensible, annular reinforcement element which is coated with rubber mix, while the toe of the bead is axially to the outside and comprises a profiled element of rubber mix in the form of a wedge which is defined by two sides starting from an apex A located beneath the section of the annular element, the radially outer side forming, with a straight line parallel to the axis of rotation passing through said apex A, an acute angle $ø_1$, which is open radially and axially towards the outside, and the radially inner side forming with said parallel line an acute angle $ø_2$, which is open radially towards the inside, the rubber mix forming the profiled element, axially adjacent to the bead wire, having a Shore A hardness greater than the Shore A hardness(es) of the rubber mixes respectively radially above said annular element and the axially adjacent profiled element. It is characterized in that the radial carcass reinforcement of said tire winds at least in the first bead around said annular element from the inside to the outside to form an upturn, the end of which is located on one hand axially to the outside of a straight line $P_2$ perpendicular to the axis of rotation and passing through the center of gravity of the meridian section of the annular element and on the other hand axially to the inside and radially to the outside of the straight line $P_1$ supporting the radially outer side of the profiled element axially adjacent said annular element.

The increase in the clamping of the bead toe on the mounting rim according to the tension of the carcass reinforcement will be greater if the profiled element of rubber mix in the form of a wedge and defined by the two sides starting from the apex A is reinforced by at least A that part of the upturn of the carcass reinforcement which is immediately adjacent that part of the carcass reinforcement which is wound around the annular bead reinforcement element, whether said part be in the profiled element or whether it forms at least one of its sides.

Advantageously, the radial carcass reinforcement of said tire is wound, at least in the first bead, around said annular element from the inside to the outside to form an upturn, extending along the radially inner side of the profiled element in the form of a wedge, then along the side opposite the apex A, then covering axially and radially to the outside at least in part the profiled element radially above the profiled element in the form of a wedge.

Preferably, the tire comprises a second bead, the seat of which is of the same configuration as the seat of the first bead, that is to say, a seat, the generatrix of which has an axially inner end on a circle of diameter greater than the diameter of the circle on which the axially outer end is located, or seat which is said to be inclined towards the outside.

Likewise, if "diameter of an inclined seat" refers to the diameter of the circle on which is located the end of its generatrix farthest from the axis of rotation, the tire advantageously has two seats which are said to be inclined towards the outside and are of different diameters.

The meridian profile of the carcass reinforcement, when the tire is mounted on its operating rim and inflated to its operating pressure, has a direction of curvature which is constant at least in the first bead and the sidewall which extends it radially, and the tangent TT' to the point of tangency T of said profile with the annular reinforcement element of said bead forms with the axis of rotation an angle ø of at least 70° which is open towards the outside.

The invention will be better understood with reference to the drawing attached to the description, which illustrates a non-limitative example of embodiment of a tire according to the invention, and which, associated with a suitable rim, forms a high-performance tire/rim assembly.

DESCRIPTION OF PREFERRED EMBODIMENTS

Figure 1:
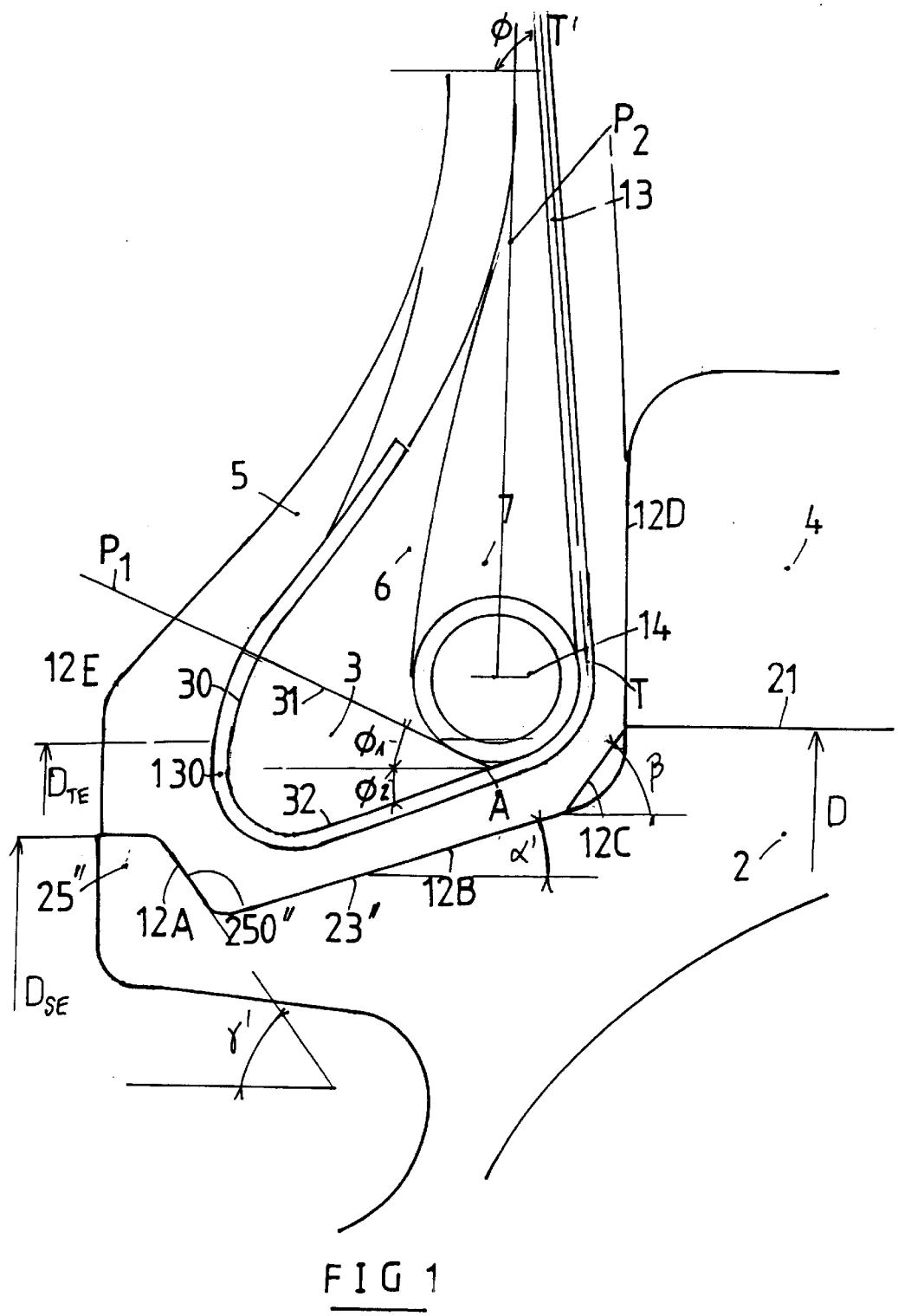
FIG. 1 is a schematic of a bead of a tire, according to the invention, mounted on the seat of its mounting rim.

The rim 2, on which the tire 1 will be mounted, is formed mainly of two frustoconical seats, the generatrices of which form with the axis of rotation an angle α' of between 4° and 30° which is open towards the inside of the tire, and in the example described the angle is equal to 14°, less than the angle of the corresponding generatrices of the seats of the beads 12 of the tire. Said seats thus have axially outer ends on circles of smaller diameters than those of the circles on which the axially inner ends are located. The seat 23", which is located for example on the outer side of the vehicle, is extended axially to the outside by a protrusion or hump 25", the inner face 250" of which forms with the axis of rotation an angle γ', the diameter $D_{SE}$ of which is less than the internal diameter $D_{TE}$ of the bead wire 14 for reinforcing the bead which is intended to be mounted on said seat, and the height $h_I$ of which, measured relative to the axially outer end of the rim seat 23", is a height comparable to the height of the humps or protrusions used axially to the inside of conventional, standardized passenger-car rims.

On the side located on the outside of the vehicle, the rim seat 23" is connected to a cylindrical portion 21 on which a bearing support 4 for the tread will come to rest. The diameter of the cylindrical portion 21 is the nominal diameter D of the rim 2.

The contour of the bead 12, mounted on the seat 23", comprises, axially to the inside, a wall 12D substantially perpendicular to the axis of rotation, which wall will bear laterally on the axially outer face of the support ring 4. Said wall 12D of the bead 12 is extended axially to the outside by a frustoconical generatrix 12C, which forms with a line parallel to the axis of rotation an angle β of 45° which is open axially towards the inside and radially towards the outside. Said generatrix 12C is itself extended axially to the outside by a second frustoconical generatrix 12B of the bead seat forming with the direction of the axis of rotation an angle α of 15°, which is open axially towards the inside and radially towards the outside. Said generatrix 12B is said to be inclined towards the outside, its axially outer end being on a circle of diameter less than the diameter of the circle on which its axially inner end is located. A frustoconical generatrix 12A, extending the generatrix 12B axially to the outside and forming with the direction of the axis of rotation an angle of γ of 45°, which is open axially and radially towards the outside, finishes off the contour of the base of the bead 12. The wall 12E, which is curved in the example described and is of substantially perpendicular general orientation to the direction of the axis of rotation of the rim, completes the contour of the bead 12. Whereas the generatrix 12B will bear on the rim seat 23", which is inclined towards the outside, the generatrix 12A will bear on the axially inner wall 250" of the protrusion or hump 25" of the rim 2, which is inclined by the angle γ', which is equal to the angle γ of the generatrix 12A. The portion of the bead adjacent the wall 12D and to the generatrix 12C, forms, viewed in meridian section, the heel of the bead 12. The portion of the bead adjacent to the generatrix 12B, to the generatrix 12A and partially to the wall 12E constitutes the toe of the bead 12. The heel of the bead 12 is reinforced by the anchoring bead wire 14 of the carcass reinforcement 13, which bead wire is coated with a rubber mix of high Shore A hardness. The toe of the bead 12 comprises a profiled element 3, arranged axially to the outside of the anchoring bead wire 14 of the carcass reinforcement 13. This profiled element 3 is in the shape of a substantially circular sector with an apex or center A located radially beneath the bead wire 14, two sides or radii 31 and 32 starting from said apex A, and a third side 30, opposite the apex A. The radially outer side or radius 31 forms with a line parallel to the axis of rotation an angle $ø_1$, which is open radially and axially towards the outside, of 45°, whereas the radially inner side or radius 32 forms with the same parallel line an angle $ø_2$, which is open radially towards the inside and axially towards the outside, of 15°. This profiled element 3 is formed of a rubber mix having in the vulcanised state a Shore A hardness of 94.

The coated bead wire 14 is surmounted radially to the outside by a profiled element 7 of rubber mix of a Shore A hardness of 37. Radially to the outside of the profiled element 3 and axially to the outside of said profiled element 7 there is arranged a third profiled element 6 of rubber mix having a Shore A hardness equal to that of the profiled element 7 and therefore significantly less than the hardness of the mix of the profiled element 3, which makes it possible, when the tension of the carcass reinforcement increases, to facilitate the axial displacement of the braided bead wire 14 towards the outside of the bead 12 and thus to create compression of the profiled element 3 and self-clamping of the toe of the bead on the mounting rim 2, whereas, in the case described, the initial clamping of the bead 12 on said rim is virtually zero, owing to the virtual equality of the angles α and α' and to the virtual equality of the largest diameters of the rim and bead seats. The bead 12 is finished off by the protector 5.

The carcass reinforcement 13 has a meridian profile, when the tire is mounted on its operating rim and inflated to its operating pressure, which has a direction of curvature which is constant over its entire length, and is such that the tangents TT' to the points of tangency T of said profile with the coated bead wires 14 of the beads 12 form with the axis of rotation angles φ of greater than 70° which are open axially and radially towards the outside and are equal to 80°. Said carcass reinforcement 13 is wound around the coated bead wire 14 from the heel to the toe of the bead 12, or from the inside to the outside, to form an upturn 130 which is substantially rectilinear and which extends along the radially inner side 32 of the profiled element 3, then along the side 30 opposite the apex A, then covering at least in part the axially and radially outer side of the profiled element 6 radially to the outside of the profiled element 3.

The end of the upturn 130 is located, on one hand axially to the inside and radially to the outside of a straight line $P_1$, said straight line $P_1$ being the straight line which supports the side 31 of the profiled element 3, and on the other hand axially to the outside of a straight line $P_2$, which is perpendicular to the axis of rotation and passes through the center of gravity of the meridian section of the coated bead wire 14. The carcass reinforcement upturn which is thus structured is of sufficient length to be able to have good strength with respect to the unwinding of the carcass reinforcement, while permitting a lesser propagation rate of the cracks which arise in the outer layer 5 of the bead 12.

We claim:

1. A tire having a radial carcass reinforcement comprising, viewed in meridian section, a first bead, having a seat which has a generatrix, the axially inner end of which lies on a circle of diameter greater than the diameter of the circle on which the axially outer end is located, the bead having a heel and a toe, the heel being axially to the inside and reinforced by at least one inextensible, annular reinforcement element which is coated with rubber mix, the bead toe being axially to the outside and comprising a profiled element of rubber mix in the form of a wedge defined by a radially inner side and a radially outer side, the two sides starting from an apex A located beneath a section of the at least one annular element, the radially outer side forming, with a straight line parallel to the axis of rotation passing through said apex A, an acute angle $ø_1$, which is open radially and axially towards the outside, and the radially inner side forming with said parallel line an acute angle $ø_2$, which is open radially towards the inside, the rubber mix forming the profiled element, axially adjacent the a least one annular element, having a Shore A hardness greater than the Shore A hardness of any rubber mixes radially above said at least one annular element and said profiled element, the tire characterized in that the radial carcass reinforcement of said tire in the bead winds around said at least one annular element from the inside to the outside to form an upturn, the end of which is located on one hand axially to the outside of a straight line $P_2$ perpendicular to the axis of rotation and passing through the center of gravity of the meridian section of the at least one annular element, and on the other hand, axially to the inside and radially to the outside of the straight line, $P_1$ defining the radially outer side of the profiled element.

2. A tire according to claim 1, characterized in that the profiled element of rubber mix in the form of a wedge and defined by the two sides starting from the apex A is reinforced by at least that part of the upturn of the carcass reinforcement which is immediately adjacent that part of the carcass reinforcement which is wound around the at least one annular bead reinforcement element.

3. A tire according to claim 2, characterized in that the radial carcass reinforcement of said tire is wound around said at least one annular element from the inside to the outside to form an upturn, extending along the radially inner side of the profiled element in the form of a wedge, then along a side opposite the apex A, then axially and radially to the outside covering at least in part a profiled element radially above the profiled element in the form of a wedge.

4. A tire according to claim 1, characterized in that it comprises a second bead having a seat, the generatrix of which has an axially inner end on a circle of diameter greater than the diameter of the circle on which the axially outer end is located, which seat is said to be inclined towards the outside.

5. A tire according to claim 4, characterized in that the generatrices of the seats of the beads are extended axially to the outside by frustoconical generatrices, forming with the direction of the axis of rotation an angle γ of 45°, which is open axially and radially towards the outside.

6. A tire according to claim 1, which includes a second bead and in which the seats of both beads are inclined towards the outside and are of different diameters.

7. A tire according to claim 1, characterized in that the meridian profile of the carcass reinforcement, when the tire is mounted on its operating rim and inflated to its operating pressure, has a direction of curvature which is constant in the sidewall and the first bead and in that a tangent TT' to the point of tangency T of said profile with the at least one annular reinforcement element of said bead forms with the axis of rotation an angle ø of at least 70° which is open towards the outside.

* * * * *